(12) United States Patent
Venugopal et al.

(10) Patent No.: US 10,684,664 B2
(45) Date of Patent: Jun. 16, 2020

(54) REMOVABLE TEST AND DIAGNOSTICS CIRCUIT

(71) Applicant: HEWLETT PACKARD ENTERPRISE DEVELOPMENT LP, Houston, TX (US)

(72) Inventors: Raghavan V. Venugopal, Spring, TX (US); Patrick A. Raymond, Houston, TX (US); William C. Hallowell, Spring, TX (US); Han Wang, Sugar Land, TX (US); Chin-Lung Chiang, Taipei (TW); Jyun-Jie Wang, Taipei (TW)

(73) Assignee: Hewlett Packard Enterprise Develepment LP, Houston, TX (US)

( * ) Notice: Subject to any disclaimer, the term of this patent is extended or adjusted under 35 U.S.C. 154(b) by 445 days.

(21) Appl. No.: 15/314,785

(22) PCT Filed: Jul. 31, 2014

(86) PCT No.: PCT/US2014/049099
§ 371 (c)(1),
(2) Date: Nov. 29, 2016

(87) PCT Pub. No.: WO2016/018351
PCT Pub. Date: Feb. 4, 2016

(65) Prior Publication Data
US 2017/0185123 A1    Jun. 29, 2017

(51) Int. Cl.
*G06F 1/26*       (2006.01)
*G06F 11/14*   (2006.01)
(Continued)

(52) U.S. Cl.
CPC ............... *G06F 1/263* (2013.01); *G06F 1/26* (2013.01); *G06F 1/305* (2013.01);
(Continued)

(58) Field of Classification Search
CPC ............. G06F 11/1441; G06F 11/0727; G06F 11/2015; G06F 11/2284; G11C 29/56; G11C 29/1201; G11C 29/46
See application file for complete search history.

(56) References Cited

U.S. PATENT DOCUMENTS 7,830,732 B2    11/2010 Moshayedi et al.
7,990,797 B2     8/2011 Moshayedi et al.
(Continued)

OTHER PUBLICATIONS

"Backup Power Charge Control and Health Monitoring—A Technology Overview," Jun. 2014, Storage Networking industry Association, http://snia.org/sites/default/files/Backup%20Power%20Charge%20Control%20%20Health%20Monitoring%20contributed%20by%20Paper%20Battery%20Jun%202014.pdf.
(Continued)

*Primary Examiner* — Jigar P Patel
(74) *Attorney, Agent, or Firm* — Brooks, Cameron & Huebsch, PLLC

(57) ABSTRACT

A test and diagnostics circuit, methods and systems are described. An example test and diagnostics circuit includes a controller and a power monitor coupled to the controller. A load switch on the test and diagnostics circuit selectably implements a load from among multiple load values to test a computing and/or data storage system. The test and diagnostics circuit includes circuitry connecting the controller, the power monitor and the load switch to receive a test enable signal from a non-dedicated pin in a non-volatile dual inline memory module (NV-DIMM) slot to implement a test operation on the system.

20 Claims, 4 Drawing Sheets

(51) Int. Cl.
  *G06F 11/20* (2006.01)
  *G06F 11/30* (2006.01)
  *G06F 1/30* (2006.01)
  *G06F 3/06* (2006.01)

(52) U.S. Cl.
  CPC ...... *G06F 11/1441* (2013.01); *G06F 11/2015* (2013.01); *G06F 11/3062* (2013.01); *G06F 3/065* (2013.01); *G06F 3/0619* (2013.01); *G06F 3/0679* (2013.01)

(56) References Cited

U.S. PATENT DOCUMENTS

| | | | |
|---|---|---|---|
| 8,566,639 | B2 | 10/2013 | Moshayedi et al. |
| 2005/0000162 | A1 | 1/2005 | Bishop |
| 2009/0177922 | A1* | 7/2009 | Eastman ............. G06F 11/0769 714/25 |
| 2009/0224771 | A1* | 9/2009 | Deveau ................ G01R 31/386 324/600 |
| 2010/0052625 | A1* | 3/2010 | Cagno ................. G01R 31/028 320/166 |
| 2010/0205348 | A1* | 8/2010 | Moshayedi ............. G11C 5/14 711/102 |
| 2010/0205470 | A1 | 8/2010 | Moshayedi |
| 2011/0066872 | A1 | 3/2011 | Miller |
| 2012/0131253 | A1 | 5/2012 | McKnight et al. |
| 2012/0203962 | A1 | 8/2012 | Mochizuki |
| 2013/0128685 | A1 | 5/2013 | Shen |

OTHER PUBLICATIONS

International Search Report and Written Opinion; PCT/US2014/049099; dated Mar. 31, 2015; 14 pages.

* cited by examiner

REMOVABLE TEST AND DIAGNOSTICS CIRCUIT

BACKGROUND

As reliance on computing systems continues to grow, so too does the demand for reliable power systems and back-up schemes for these computing systems. Servers, for example, may provide architectures for backing up data to flash or persistent memory as well as back-up power sources for powering this back-up of data after the loss of power. Backup power sources may sometimes include energy components such as capacitors or batteries.

DETAILED DESCRIPTION

Figure 1:
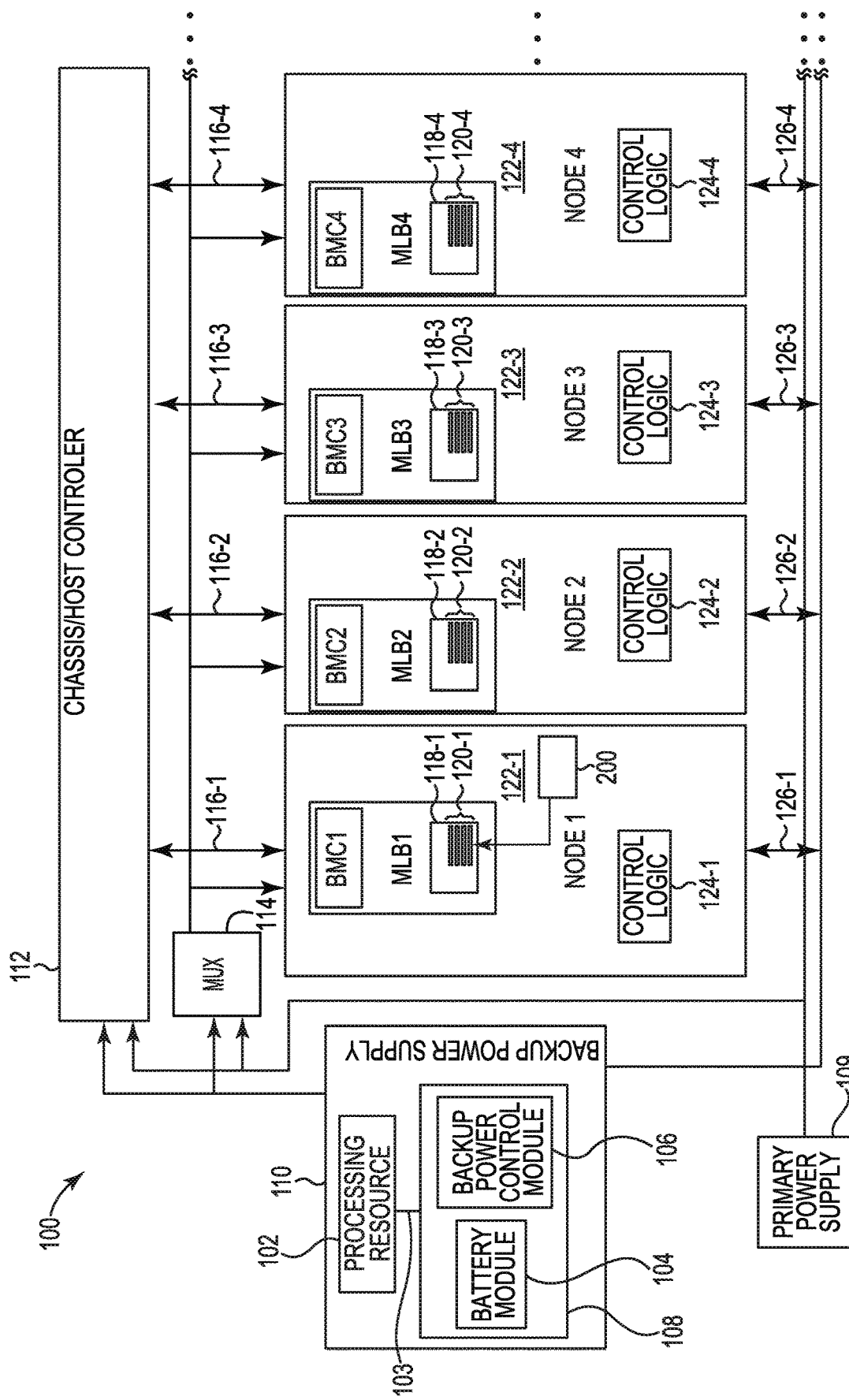
FIG. 1 illustrates a block diagram of an example of a system for providing backup power and a removable test and diagnostics circuit according to the present disclosure.

A computing data storage system can include a number of nodes that support a number of loads. The nodes can represent a number of servers, for example. A number of loads can include cache memory, dual inline memory modules (DIMMs), array control logic, etc., associated with the servers. A data storage system can include a backup power system operatively coupled to the number of nodes to support the number of loads in an event of a removal of a primary power supply. The power system can include a battery module and a backup power controller module that determines a backup power demand of at least one load to the number of nodes and can selectively provide backup power from the battery module to one or a number of nodes and/or loads in parallel.

A removal of a primary power supply can be a scheduled and/or an un-scheduled primary power supply removal. For instance, a scheduled removal of the primary power supply can be the result of scheduled maintenance on the number of nodes and/or the number of loads. A scheduled removal of the primary power supply can be an intentional power down of the number of nodes and/or the number of loads to add and/or remove nodes to a chassis and/or network connected to a primary power supply, and/or to add and/or remove one or more loads to/from one or more nodes.

An un-scheduled primary power supply removal can be a failure in the primary power supply. An un-scheduled primary power supply removal can occur when, for example, the primary power supply fails momentarily and/or for an extended period of time.

There can be a need to move data from cache memory in the number of nodes to non-volatile memory upon the removal of a primary power supply. However, moving data from cache memory to non-volatile memory can involve a power supply. A backup power supply can be a secondary power supply that is used to provide power for moving data from cache memory to non-volatile memory when the primary power is removed.

In some examples, the backup power for moving data from cache memory to non-volatile memory may include providing each node with a separate backup power supply. That is, if there are two nodes then each node is coupled to a separate backup power supply.

However, in the present disclosure, a backup power supply is provided that can provide backup power for a number of nodes. Systems, apparatuses, and methods for testing the same are described. Testing a backup power supply can include simulating loss of power for a node and/or number of nodes. Testing a backup power supply for a number of nodes can pre-investigate scenarios to validate the design of computing and data storage systems, system integration, and to reduce potential design risk. Testing a backup power supply may also validate the design of computing and data storage systems to afford a greater amount of time to move data using the backup power supply, as well as help determine the most efficient functioning of the system. In some examples, simulating power loss via testing can identify a design and/or efficiency level for more data that may be able to be transferred from cache memory to non-volatile memory in a server system or datacenter environment. This can be due to the pre-investigated test scenarios for supplying backup power under the current disclosure.

FIG. 1 illustrates a block diagram of an example of a system 100 for providing backup power and a removable test and diagnostics circuit according to the present disclosure. FIG. 1 includes a backup power supply 110 a multiplexer (MUX) 114, a chassis/host controller 112, a number of nodes 122-1, 122-2, 122-3, 122-4, e.g., referred to generally as nodes 122. FIG. 1 also includes a number of control logic units 124-1, 124-2, 124-3, and 124-4, e.g., referred to generally as control logic 124.

The backup power supply 110 can include a processing resource 102 connected via a connection 103 to a memory resource 108, e.g., a computer-readable medium (CRM), machine readable medium (MRM), database, etc. In some examples, memory resource 108 may be a non-transitory storage medium, where the term "non-transitory" does not encompass transitory propagating signals. The memory resource 108 can include a number of computing modules. The example of FIG. 1 shows a battery module 104 and a backup power control module 106. As used herein, a computing module can include program code, e.g., computer executable instructions, hardware, firmware, and/or logic. But the computing module 106 at least includes instructions executable by the processing resource 102, e.g., in the form of modules, to perform particular actions, tasks, and functions described in more detail herein in reference to FIG. 2, FIG. 3, and FIG. 4. Instructions executable by the processing resource 102 associated with a particular module, e.g., modules 104 and 106, can also be referred to and function collectively as a component and/or computing engine. As used herein, an engine can include hardware firmware, logic, and/or executable instructions. But the computing module 106 at least includes hardware e.g., logic in the form of an application specific integrated circuit (ASIC), to perform particular actions, tasks and functions described in more detail herein in reference to FIG. 2, FIG. 3, and FIG. 4.

Engines and/or the number of modules, e.g., 104 and 106 shown in FIG. 1, can be sub-engines/modules of other engines/modules and/or combined to perform particular actions, tasks, and functions within a particular system and/or computing device.

Engines and/or modules described herein can be located in a single system and/or computing device or reside in separate distinct locations in a distributed computing environment, e.g., cloud computing environment. Embodiments are not limited to these examples.

Figure 2:
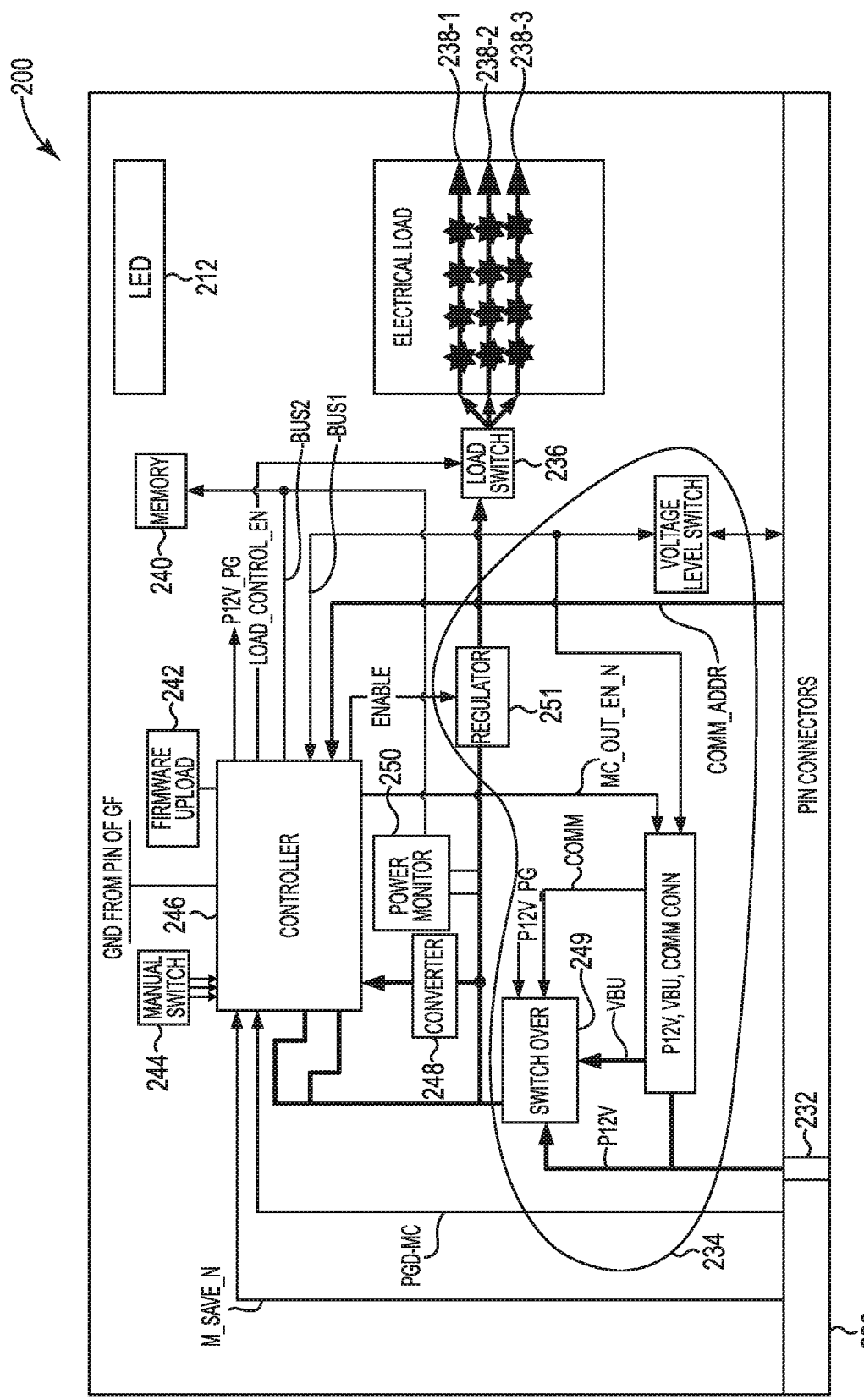
FIG. 2 illustrates a block diagram of a removable test and diagnostics circuit according to the present disclosure.
Figure 3:
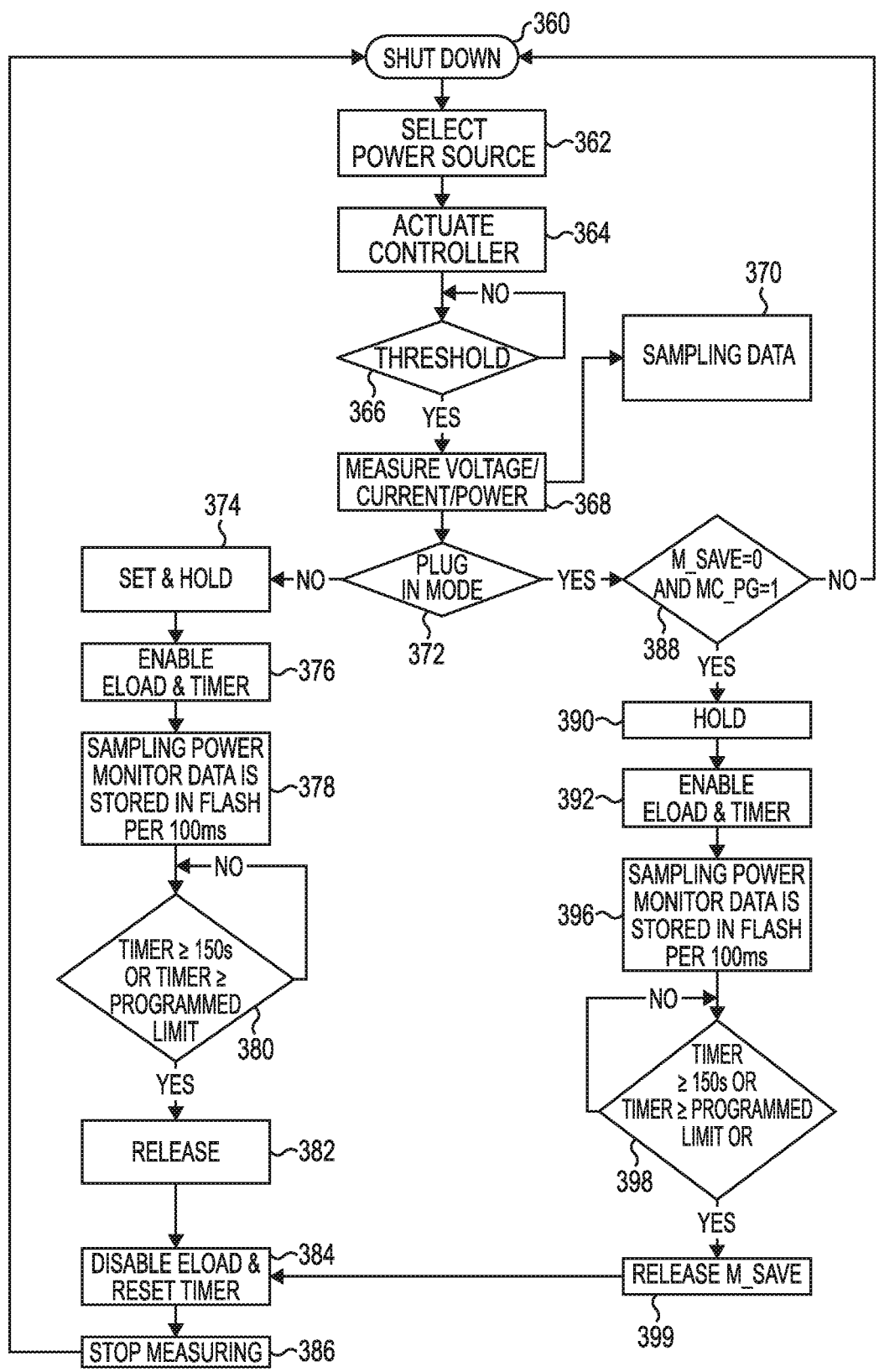
FIG. 3 illustrates a flow diagram of an example of a method for operating a removable test and diagnostics circuit according to the present disclosure.
Figure 4:
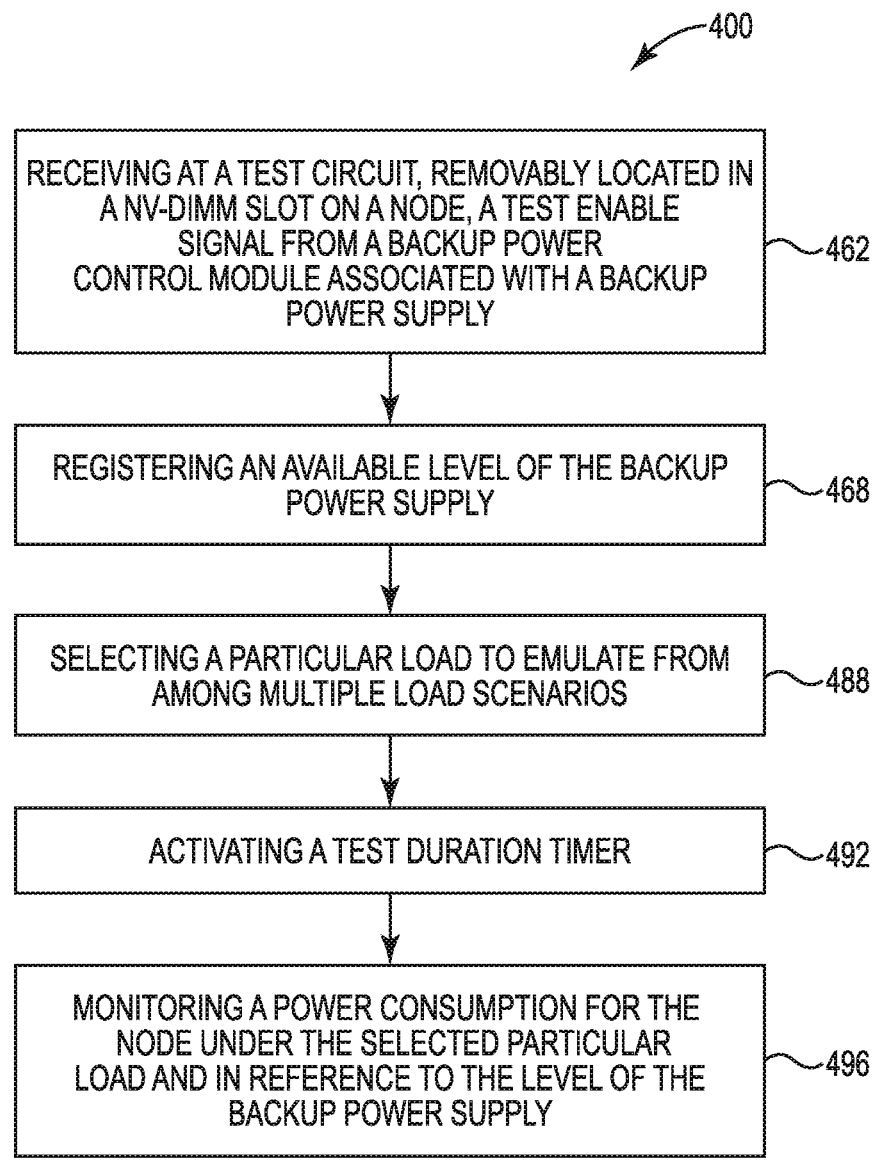
FIG. 4 illustrates another flow diagram of an example method for operating a removable test and diagnostics circuit according to the present disclosure.

The system 100 can perform a number of functions and operations as described in FIG. 2, FIG. 3, and FIG. 4, and include the apparatus and methods for testing backup power described herein. The system 100 can include a a primary power supply 109 coupled to a chassis/host controller 112, the MUX 114, and the number of nodes 122-1, 122-2, etc.

The backup power supply 110 can be a battery that is external to the number of nodes and external to the chassis/host supporting the number of nodes. The backup power supply 110 can provide power to the nodes 122. The backup power supply 110 can support different chassis/host controllers, e.g., not shown, and different MUXs (not shown) to support a plurality of nodes on different chassis.

In the example of FIG. 1, control logic 124 can be located on a chassis and independently associated with each node 122-1, 122-2, etc. However, embodiments are no so limited and control logic 124 may be separate from the chassis/host and/or support multiple nodes.

In some examples, the backup power supply 110 can control the power supplied to a number of nodes and identify the state of the nodes 122 that are coupled to the backup power supply 110. Each of the nodes 122 can include a main logic board (MLB), e.g., MLB1, MLB2, MLB3, MLB4, etc. Each MLB can include a baseboard management control (BMC) unit. In some examples, the MLB components can allow the nodes 122 to communicate with the backup power supply 110 and the chassis/host controller 112. Each of the nodes 122 can contain local memory or data storage 118-1, 118-2, 118-3, 118-4, e.g., referred generally as memory 118. The memory 118 may contain volatile and non-volatile memory, e.g., cache and non-volatile memory dual inline memory modules (NV-DIMM). Thus, each memory 118, in each of the nodes 122, can contain a number of NV-DIMM slots, e.g., 120-1, 120-2, 120-3, and 120-4 (referred generally as NV-DIMM slots 120). Each NV-DIMM slot 120 can provide a load to the system 100. A test and diagnostics circuit 201, as shown in FIG. 2, can be provided to an NV-DIMM slot 120 to test each node 122 to determine proper functionality of the system 100.

FIG. 1 shows four (4) nodes 122-1, 122-2, 122-3, and node 122-4, as an example. However, fewer or more than four (4) nodes may be provided, e.g., two (2) nodes. Each of the nodes 122 can host a number of DIMM loads. For example, each of the node 122 may host twenty-four (24) or more loads. In some examples, more or fewer loads can be hosted in a node.

Signal and control lines can connect the backup power supply 110 to the chassis/host controller 112 and to the MUX 114. The MUX 114 and the chassis/host controller 112 can be coupled to the nodes 122 via a number of signal lines 116-1, 116-2, 116-3, 116-4 (referred to generally as 116). The number of signal lines 116 can provide for the install, registering, data, and clocking of the nodes with the chassis/host controller 112.

The chassis/host controller 112 can control management of the nodes 122 under both a primary 109 and a backup power supply 110. The chassis controller's 112 control management function for the nodes 122 can include testing an addition and/or removal of node connections. Testing the addition and/or removal of nodes 122 and/or loads can include dynamically testing the connections of the nodes 122 to the chassis/host controller 112.

The chassis/host controller 112 can be separate from the chassis supporting the number of nodes and the MUX 114.

In some examples, the nodes 122 can be connected in parallel on one chassis and can be serially chained to the backup power supply 110 on multiple different chassis. As stated, the chassis/host controller 112 can be used to test control, additions, removal, and/or registration of nodes with the chassis. The chassis/host controller 112 can also control operation of the nodes 122 such as the movement of data from volatile memory (e.g., cache) to persistent memory, e.g., to non-volatile memory (persistent DRAM, flash, etc.), In some examples, the chassis/host controller 112 can be coupled to control logic 124. Backup power control module 106 can be coupled to control logic 124. The control logic 124 can be used to determine whether backup power from the backup power supply 110 should be supplied to nodes 122.

During a system test using a test and diagnostics circuit 200, a simulation can be performed in which the primary power supply can be removed, then data can be transferred from the cache memory in the loads to persistent memory, e.g., to a number of non-volatile (NV) dual in-line memory modules having flash memory, persistent dynamic random access memory, etc. The simulation of power loss can identify an efficient manner of transferring of data. For example, data can be moved from cache memory to at least sixteen (16) NV DIMMs having flash memory. In some examples, the flash memory of the at least 16 DIMMS can include flash memory having multilevel cells (MLCs). Moving the data can include moving the data to non-volatile memory that is local to the nodes 122, external to the nodes 122, and/or external to the power management system.

In some examples, the control logic 124 can be coupled to the nodes via an control signal and power lines 126-1, 126-2, 126-3, 126-4, e.g. referred generally as control signal and power lines 126. For example, the nodes 122 can provide a signal to the signal lines 126 and 116 when data needs to be backed up to non-volatile memory. The signal lines 116 and 126 also couple the chassis/host controller 112 to the nodes 122 and the control logic 124.

In some examples, a P12V can provide a same voltage and/or a different voltage, e.g., power, to the control logic 124 and the nodes 122, than a voltage provided by the backup power supply 110 via a VBU. For example, the primary power source can provide 12 volts via the P12V while the backup power supply can provide a different voltage via the VBU.

In some examples, the control logic can determine a backup power supply to the nodes 122 and can provide the output of power from the battery module 104 to each of the selected nodes 122 in parallel. Providing the output of power form the battery module 104 to each of the selected nodes 122 in parallel can enable the nodes 122 to perform backup functions in parallel. An example of providing output of power from the battery module 104 to each of the selected nodes 122 in parallel is provided in co-pending application Ser. No. 14/32480, entitled "Providing Backup Power" and having common inventors filed on Apr. 1, 2014.

FIG. 2 illustrates a block diagram of a removable test and diagnostics circuit according to the present disclosure. In some examples, as shown in the example of FIG. 2, the test and diagnostics circuit 200 can include a test and diagnostics circuit card. The test and diagnostics circuit 200 is a card conforming to a dual inline memory module form factor. In some examples the test and diagnostics circuit card includes a removably insertable 288 pin card compliant to a double data rate 4 (DDR4) NV-DIMM card form factor. As shown in FIG. 2, the test and diagnostics circuit 200 includes a controller 246 and a power monitor 250 coupled to the controller 246. The controller 246 is connected to a load switch 236 that can selectably implement a load from among multiple load values to test a backup power supply demand of one or more loads on one or more server nodes, e.g., 122-1, 122-2, 122-3, 122-4 shown in FIG. 1. For example, depending upon a system test scenario, the load switch 236 can select which load values 238-1, 238-2, 238-3, 238-4, e.g., collectively referred to as load values 238, to use when testing a server node.

In some examples, circuitry 234 connecting the controller 246, the power monitor 250 and the load switch 236 can receive a test enable signal from a non-dedicated pin 232 in the NV-DIMM slot, e.g., 120 in FIG. 1, to implement a test operation on the server node 122. As used herein, a non-dedicated pin is a pin not being used for other purposes from among the pins within NV-DIMM pin connectors 230. In some examples, a manual switch 244 can control and operate a test and diagnostics circuit 200 in a stand-alone mode. For example, an administrator, circuit designer, customer, etc., can control or operate the test and diagnostics circuit via the manual h 244 to test the backup power supply.

As stated, the test and diagnostics circuit 200 can be a double data rate fourth generation (DDR4) dual in-line memory module (DIMM) 288 pin board template. The test and diagnostics circuit 200 can communicate with the host system with the same pins (e.g., 288 pin board) as a typical NV-DIMM. For example, the controller 246 can hold a test enable signal received to the non-dedicated pin 232.

The test enabled signal can notify the server node of a selection of a particular operation test mode, e.g., a stand-alone test mode, a plug-in test mode, and/or a run-time test mode. In some examples, the controller 246 can perform a backup power supply test in a stand-alone test mode. For example, a stand-alone test can be conducted separate from the system shown in FIG. 1. For instance, a power monitor 250 can simulate and monitor a system load status and performance, such as a memory 118-1, 118-2, 118-3, 118-4 as shown in FIG. 1, to emulate power backup behavior. The power monitor 250 can include logic and circuitry to perform the functions described herein. The test and diagnostics circuit 200 can emulate a backup power supply, a host API, and/or other system, e.g., hardware, behavior, or can monitor the power consumption via an external interface, e.g., and communication interface. The test information can be archived and processed to evaluate system and/or backup power supply performance.

In some examples, the controller 246 can perform a backup power supply test in a plug-in test mode. The backup power supply test, in plug-in mode, can perform intelligent load management using circuitry 234 and controller 246 and communicate with the chassis/host controller, e.g., 112 in FIG. 1, to report real time voltage (V), current (I), and power (W) status. The chassis/host controller 112 in system 100 of FIG. 1 can send an M_SAVE, power good, reset signals, among other information, e.g., via the signal lines 116 and 126 in FIG. 1, to the test and diagnostics circuit 200. The test information can be recorded and saved into memory 240, such as persistent memory, located on the test and diagnostics circuit 200 for archiving and processing. In some examples, the controller 246 can conduct, e.g., instruct and control, a real-time host power supply test. For example, voltage (V), current (I), and power (W) status of a particular power supply can be tested in real time. The test information can be used to determine whether the backup power supply will be sufficient in an instance (scenario) of a scheduled power loss and/or an unscheduled loss of primary power.

In some examples, the circuitry 234 and controller 246 can operate to store monitored test information at selected intervals on the test and diagnostics circuit. For example, the load monitor can record battery discharge data into the memory 240. In some examples, the circuitry 234 and controller 246 can instruct and control visual indicators 212, e.g., LEDs, which are located on the test and diagnostics circuit 200 to visually indicate information relative to the test operation. For example, an LED e.g., 212, light can indicate a test operation status. In some examples, the circuitry 234 and controller 246 can instruct and control the switching of power externally provided to the test and diagnostics circuit. Alternatively, a signal may be provided to and received by the control logic, e.g., 124-1, 124-2, etc. in FIG. 1, indicating removal of a primary power supply. Removal of the primary power supply can trigger a determination, by the control logic 124 that, to provide power from the backup power supply to the number of nodes.

In some examples, the controller 246 can be configured to upload firmware 242 to the controller 246. For example, updates to firmware can be uploaded at 242 to the controller 246 to implement the updated versions of firmware. In some examples, the controller 246 executes logic to perform system diagnostics on a host, e.g., the chassis/host controller 112 in FIG. 1, primary power supply 109 and a backup power supply 110. As used herein, diagnostics is intended to include power consumption, efficiency levels, load values 238, energy consumption, among other diagnostics. Embodiments, however, are not limited to these examples.

As shown in FIG. 2, the circuitry can also include a converter 248, e.g., logic, to perform communication protocol conversion from the server node 122 to the controller 246 of the test and diagnostics circuit 200, When a primary power supply is removed, a switchover circuit 249 can perform and simulate a switch to between a primary power supply, e.g., P12V, and a backup power supply, e.g., VBU, and provide backup power supply to the test and diagnostics circuit 200. The controller 246 includes logic to check the battery status and enable a regulator 251, e.g., VRD regulator, and turn on the load switch 236 during a power supply test operation. The test and diagnostics circuit 200 can turn the load switch 236 on and off during the power backup time period. Thus, the circuitry within the test and diagnostics circuit 200 can simulate converting from one power device to a second power device with various load values 238, Such switch and conversion can occur seamlessly and with minimum power waste during the voltage conversion when the removal of power is not merely a test scenario.

FIG. 3 illustrates a flow diagram of an example of a method for operating a removable test and diagnostics circuit, such as the test and diagnostics circuit 200 of FIG. 2, according to the present disclosure. At 362, the test and diagnostics circuit can select a power source, e.g., primary power supply 109 or backup power supply 110 in FIG. 1, or another power device, e.g., in stand-alone mode. A power source can be a component associated with the backup power supply 110, e.g., battery module 104. At 364, the test and diagnostics circuit can actuate the controller. For example, test and diagnostics circuit 200 can use signal lines M_SAVE_N and PGD_MC connected to pin connectors 230 to actuate controller 246. Once powered up, the controller 246 signals the circuitry 234 on the test and diagnostics circuit 200 that there is available power level, e.g. primary P12V or backup power VBU.

In some examples, a test operation may not be actuated and performed unless a power supply level received to the test and diagnostics circuit 200 is below, at or above a certain threshold as determined at 366. For example, the controller 246 logic may check the input power through sense resistors to confirm whether a selectable, predetermined power level, e.g., 9.2 Volts (V) of power or more, is present in order to perform a power supply test, e.g., test and diagnostics circuit operation. If the power level does not exceed the particular threshold, the controller can wait until the power level exceeds the particular threshold before commencing the power supply test. Alternatively, if the power level exceeds the particular threshold, the power supply test operation, e.g., system simulation continues operation. For example, if the particular threshold is set to 9.2V and the controller measures 9.4V, then the power simulation continues.

At 368, the test and diagnostics circuit can measure the voltage (V), current (I) and/or power (W) level associated with the power supply connected to the test and diagnostics circuit 200, e.g., using the power monitor 250 in FIG. 2 and can sample and record this information (sampling data) at 370, e.g., can record in the memory 240 of the test and diagnostics circuit 200. In some examples, the test and diagnostics circuit 200 is used to sample the measured voltage (V), current (I), and/or available power level (W) and discharge associated with a backup power supply, e.g., 110 in FIG. 1. Logic in the power monitor 250 can be configured to sample and store this data and record to the memory 240 at a particular sampling rate. For example, a particular sampling rate can be from every 200 milliseconds (ms) to as frequently as every 2 ms.

Based on input to the manual switch 244 the controller can register, at 372, whether the test and diagnostics circuit 200 is operating in plug in mode, e.g., removably located in an NV-DIMM slot 120-1, 120-2, etc. in FIG. 1. In plug-in mode a computing or data storage system, e.g., 100, may perform operations analogous to the manner in which it would when a true NV-DIMM card were placed in an NV-DIMM slot 120-1, 120-2, etc. rather than the test and diagnostics circuit 200 card. That is, in an event of removal of primary power supply, e.g., P12V failure, the system 100 could be controlled, using the backup power control module 106 to switch to backup power automatically. If the test and diagnostics circuit is operating in plug in mode, at 388, the system 100 can send signals, e.g., M_SAVE, form a host, e.g., the chassis/host controller 112 in FIG. 1, using pin connections 230, which indicate a switch to backup power supply. For example, the signals can indicate adequate power, reset signals, etc. to perform the test operation. Alternatively, if the correct signal were not received, the chassis/host controller 112 may signal to the system 100 to reset and shut down at 360 and await an available signal to recommence such an operation.

If the test and diagnostics circuit 200 receives test enabled signal e.g., M_SAVE=0 and MC_PG=1, a power level is held on at 390 and the controller 246 can enable a selective electrical load (Eload) using signals to the load switch 236 and a timer may be set for the test operation at 392. In some examples, the test and diagnostics circuit 200 can receive and hold a test enable signal from a non-dedicated pin from among the pin connections 230 in a NV-DIMM slot form factor. In some examples, the test and diagnostics circuit can select a load from among multiple load values, e.g., 238-1, 238-2, etc. in FIG. 2, to test a battery module. For example, a particular electrical load (Eload) for simulating data transfer from cache memory to NV-memory, e.g., flash memory, in a computing and/or data storage system, such as the system 100 of FIG. 1, can be selected. At 392, the controller 246 logic can enable a particular, selectable backup time duration, e.g., test operation period. For example, a data transfer test operation period for a test and diagnostics circuit 200 simulation of the system 100 may be set at 150 seconds.

At 396, the logic of the controller 246 controls sampling by the power monitor 250 of data, e.g., current (I), voltage (V), and power discharge (W), and stores the information in the memory 240. In some examples, the logic on the power monitor 250 and/or controller 246 can store monitored test information at selected intervals in the memory 240 on the test and diagnostics circuit 200. For example, the logic may set the sampling rate such that the power monitor 250 samples and stores the data every 100 ms.

At 398, the controller 246 logic can verify elapsed time against a selected test operation period, e.g., 150 seconds. That is, a timer can be programmed to time a particular time limitation. For example at 398 the controller 246 logic will check to determine whether the elapsed time since a start of the test operation period is greater than or equal to 150 seconds or another programmed time limit.

A simulated test operation time period may be configured to mimic a safe, available time period to transfer data stored in cache memory to be transferred to non-volatile memory. That is, in some examples, a backup power supply 110 may be able to supply the power for memory transfer for at least 150 seconds. Embodiments for checking power discharge and IV consumption using the test and diagnostics circuit 200 removably locatable in an NV-DIMM slot are not, however, limited to the examples given herein.

As shown in FIG. 3, once the timer has reached the designated time span, the test enable signal can be released at 399. For example, an M_SAVE signal could be released in order to disable the test operation, e.g., disable the Eload and reset the timer, at 384. At 386 the test and diagnostics circuit 200 could halt measuring the voltage (V), current (I), and power (W) levels at 386 and the system 100 could return to shut down at 360 and await signals to recommence operation.

Alternatively, if the test and diagnostics circuit is not operating in plug in mode, the power level may be set and physically held at 374. As noted earlier, in some examples, the test and diagnostics circuit 200 can perform a communication protocol conversion between a given node, e.g., 122-1, 122-2, etc. in FIG. 1 and the test and diagnostics circuit 200, including a direct current (DC) level conversion using the converter, e.g., 248 in FIG. 2.

In this scenario, at 376, the test and diagnostics circuit enables the Eload and timer analogous to enabling Eload and timer while operating in plug-in mode as described above. At 378, the test and diagnostics circuit samples the power monitor data and stores in flash memory analogous to operating in plug-in mode as described above. At 380, a timer can be checked and referenced analogous to operating in plug-in mode as described above.

Once an allotted test and diagnostics circuit operation time period has elapsed, then at 382 the test operation may be released and the Eload and timer are disabled/reset at 384. At 386, the test and diagnostics circuit ceases measuring the power supply and returns to shut down at 360.

In some examples, the test and diagnostics circuit is a test and diagnostics circuit card having double data rate 4 (DDR4) form factor which is removably located in a 288 pin NV-DIMM slot and having a pin to receive control signals from a non-dedicated pin in the 288 pin NV-DIMM slot.

FIG. 4 illustrates another flow diagram of an example method for operating a removable test and diagnostics circuit according to the present disclosure. At 462, the method includes receiving at a test and diagnostics circuit, removably located in a non-volatile dual inline memory module (NV-DIMM) slot on at least one of a plurality nodes, a test enable signal from the backup power control module 106, the chassis/host controller 112 or other source. For example, the test and diagnostics circuit can be placed in an NV-DIMM slot, e.g., 120-1, 120-2, etc., within a node, e.g., 122-1, 122-2, etc. in FIG. 1. In at least one example, receiving the test enable signal can include receiving the test enable signal to a non-dedicated pin in a 288 pin, non-volatile dual inline memory module (NV-DIMM) slot according to a double data rate 4 (DDR4) form factor. A backup power supply may then be provided to a node can to be tested to determine efficiency and adequate power supply according to a form factor of an existing NV-DIMM slot to a system.

At 468, the method 400 can include registering an available level of the backup power supply (VBU). Testing the amount of backup power supply (VBU) can be determined. The tested backup power supply supports at least two nodes on a chassis. Each node supports multiple loads. In some examples, a test power backup supply can vary based on the number of loads that the backup power supply supports. For example, more power can be drawn from the backup power supply if the backup power supply supports four loads rather than two loads. In some examples, the backup power supply can be located in a chassis that is separate from the nodes.

At 488, the method can include selecting a particular load to emulate from among multiple load scenarios. For example, the method 400 can exercise intelligent power switching capability. That is, the VBU can provide power to electrical loads, in addition to static voltage. Providing power and static voltage can prevent the voltage from decreasing while the VBU discharges and from causing the electrical output load to become unstable. For instance, providing power and static voltage to electrical loads, can prevent power waste and/or shift that may disrupt the backup process.

In some examples, selecting the particular load can include providing a test and diagnostics circuit for each of the plurality of nodes and selecting a load for each of the plurality of nodes independently. For example, selecting a particular load can include determining a test backup power supply to a portion of the number of nodes that are coupled to the backup power supply. In some examples, selecting the load for each of the plurality of nodes independently can include selecting different load levels for at least two of the plurality of nodes. For instance, a determination can be made during the testing to provide power from the backup power supply to a first node and to not provide power from the backup power supply to a second node, both the first node and the second node being coupled to the backup power supply. A determination to provide power to the first node can, for example, be made because the first node has cache that needs to be backed-up. Furthermore, a determination not to provide power to the second node can be made because the second node has cache that does not need to be backed-up.

At 492, the method can include activating a test duration timer. The test duration timer can be programmable, e.g., up to 150 seconds. In this scenario, the test duration timer can initiate and continue timing for up to 150 seconds of backup power supply. During the period of time, the test can determine how much power is needed to transfer an amount of information/data from cache memory to non-volatile memory. In this manner, the test duration timer tracks a test of the at least one node at the particular load for a selected duration. For instance, testing and determining a backup power demand and operate the logic controllers or other components to transfer data from volatile, e.g., cache, memory simulated by the multiple loads, to persistent memory, e.g., to non-volatile memory. Non-volatile memory may include by way of example, and not by way of limitation, multiple non-volatile dual in-line memory modules (NV-DIMMs) having multilevel cell (MLC) flash memory. Embodiments, however, are not so limited. The transfer of data can occur, for example, when a primary power supply is removed, for example, based on a failure of the primary power supply.

In one scenario, the test backup power supply can provide the output of power to each of six (6) array controllers and to each of sixteen (16) NV-DIMMs on one chassis in parallel and to another number of nodes supporting multiple loads on a different chassis sequentially for more than a specified time period. For instance, the tested backup power supply can provide up to 150 second of power.

At 496, the method can include monitoring a power demand for the at least one node under the selected particular load and in reference to an available level of the backup power supply. In some examples, monitoring the power demand includes monitoring a power demand of a host and a backup power status of the battery module.

In some examples, monitoring the power demand can include monitoring a power consumption from the backup power supply by the at least one node. For example, different nodes carry different loads. The power consumption may be different among the different nodes. Monitoring the power consumption, such as voltage (V), current (I), and power status (W), of at least node can assist in determining whether an adequate power supply is available in the event if the primary power source fails. In some examples, monitoring can include storing information on the power consumption in a non-volatile memory at a selected interval on the test and diagnostics circuit. For example, monitoring at selected intervals can collect a variety of data information relevant to the test and diagnostics circuit. For instance, the controller 246 can monitor input power voltage through sense resistors. The controller 246 can convert the data by the ADC converter and store the data in the memory. In some examples, the sampling rate can sample up to 500 Hz (2 ms).

In some examples, the method 400 can include verifying a test mode selected from a plug-in test mode, a stand-alone test mode, and a run-time test mode, and/or locking a test enable on in the plug-in test mode. For example, two different test modes, plug-in mode and stand-alone mode, can be differentiated based on whether the test operation is provided as a test kit in a design process, in the field, or to a customer, or in the manufacturing process.

In some examples, the method 400 can include verifying a communication capability between the at least one node and a controller of the backup power supply using an interface and a chassis controller associated with the plurality of nodes. For example, verifying communication capability can test whether signals are sent and received by the controller. For instance, the controller can collect information from the nodes relevant to electrical loads and power consumption. In the present disclosure, reference is made to the accompanying drawings that form a part hereof, and in which is shown by way of illustration how some examples of the disclosure can be practiced. These examples are described in sufficient detail to enable those of ordinary skill in the art to practice the examples of this disclosure, and it is to be understood that other examples can be used and that process, electrical, and/or structural changes can be made without departing from the scope of the present disclosure.

The figures herein follow a numbering convention in which the first digit corresponds to the drawing figure number and the remaining digits identify an element or component in the drawing. Elements shown in the various figures herein can be added, exchanged, and/or eliminated so as to provide a number of additional examples of the present disclosure. As used herein, the designators "N" and "M", among others, indicate that a number of the particular feature so designated can be included with some examples of the present disclosure. In addition, the proportion and the relative scale of the elements provided in the figures are intended to illustrate the examples of the present disclosure, and should not be taken in a limiting sense.

The specification examples provide a description of the applications and use of the system and method of the present disclosure. Since many examples can be made without departing from the spirit and scope of the system and method of the present disclosure, this specification sets forth some of the many possible example configurations and implementations.

As used herein, "a" or "a number of" something can refer to one or more such things. For example, "a number of widgets" can refer to one or more widgets.

What is claimed:

1. A backup power testing and diagnostic system, comprising:
   a plurality of nodes, wherein a node within the plurality of nodes contains at least one non-volatile dual inline memory module (NV-DIMM) slot;
   a battery module;
   a backup power control module having instructions stored in a non-transitory storage medium and executed by a processing resource to determine, based on monitored power, a backup power demand of at least one load to the node and to provide backup power from the battery module to the node; and
   a test and diagnostics circuit removably located in the NV-DIMM slot to test the battery module and the node.

2. The backup power testing and diagnostic system of claim 1, wherein the test and diagnostics circuit includes logic to perform a communication protocol conversion between the node and the test and diagnostics circuit, including a direct current (DC) level conversion.

3. The backup power testing and diagnostic system of claim 1, wherein the test and diagnostics circuit includes logic to monitor system power of a host and a backup power status of the battery module.

4. The backup power testing and diagnostic system of claim 1, wherein the test and diagnostics circuit is a test and diagnostics circuit card having double data rate 4 (DDR4) form factor which is removably located in a 288 pin NV-DIMM slot and having a pin to receive control signals from a non-dedicated pin to the 288 pin NV-DIMM slot.

5. The backup power testing and diagnostic system of claim 4, wherein the test and diagnostics circuit includes logic to:
   receive and hold a test enable signal from the non-dedicated pin; and
   store monitored test information at selected intervals on the test and diagnostics circuit.

6. The backup power testing and diagnostic system of claim 1,
   wherein the test and diagnostics circuit includes logic to select a load from among multiple load values to test the battery module.

7. The backup power testing and diagnostic system of claim 1,
   wherein the test and diagnostics circuit includes logic to receive a test enable signal from a non-dedicated pin of the NV-DIMM slot.

8. The backup power testing and diagnostic system of claim 1,
   wherein the test and diagnostics circuit includes logic to store monitored test information at selected intervals on the test and diagnostics circuit.

9. The backup power testing and diagnostic system of claim 1, comprising:
   a primary power supply to supply power to the plurality of nodes,
   wherein the battery module is to supply backup power to the plurality of nodes.

10. A test and diagnostic circuit, comprising:
    a controller;
    a power monitor coupled to the controller;
    a load switch to selectably implement a load from among multiple load values to test a server node; and
    circuitry connecting the controller, the power monitor and the load switch to receive a test enable signal from a non-dedicated pin in a non-volatile dual inline memory module (NV-DIMM) slot to implement a test operation on the server node.

11. The test and diagnostics circuit of claim 10, wherein the controller includes logic to:
    hold the test enable signal received to the non-dedicated pin;
    perform a backup power supply test in a stand-alone test mode;
    perform a backup power supply test in a plug-in test mode; and
    perform a real-time host power supply test.

12. The test and diagnostics circuit of claim 10, wherein the circuitry further includes second circuitry to:
    perform communication protocol conversion from the server node to the controller;
    store monitored test information at selected intervals on the test and diagnostics circuit;
    visually indicate information relative to the test operation;
    switch power externally provided to the test and diagnostics circuit; and
    upload firmware to the controller.

13. The test and diagnostics circuit of claim 12, wherein the controller includes logic to perform system diagnostics on a host power supply and a backup power supply.

14. The test and diagnostic circuit of claim 10,
    wherein the test and diagnostic circuit has a double data rate 4 (DDR4) form factor and is removably insertable in the NV-DIMM slot, which is a 288 pin NV-DIMM slot.

15. A method of testing backup power and diagnostics for a plurality of nodes, comprising:
    receiving at a test and diagnostics circuit, removably located in a non-volatile dual inline memory module (NV-DIMM) slot of at least one of the plurality nodes, a test enable signal from a backup power control module associated with a backup power supply;
    registering, by the test and diagnostics circuit, an available level of the backup power supply;
    selecting, by the test and diagnostics circuit, a particular load to emulate from among multiple load scenarios;
    activating, by the test and diagnostics circuit, a test duration timer; and monitoring, by the test and diagnostics circuit, a power demand for the at least one node under the selected particular load and in reference to the level of the backup power supply.

16. The method of claim 15, wherein receiving the test enable signal includes receiving the test enable signal to a non-dedicated pin in a NV-DIMM slot according to a double data rate 4 (DDR4) form factor.

17. The method of claim 16, wherein the method includes:
verifying a test mode selected from a plug-in test mode, a stand-alone test mode, and a run-time test mode; and
locking a test enable signal on in the plug-in test mode.

18. The method of claim 15, wherein selecting the particular load includes
providing a test and diagnostics circuit for each of the plurality of nodes and selecting a load for each of the plurality of nodes independently, wherein selecting the load for each of the plurality of nodes independently includes selecting different load levels for at least two of the plurality of nodes.

19. The method of claim 15, wherein the method further includes verifying a communication capability between the at least one node and a controller of the backup power supply using an interface and a chassis controller associated with the plurality of nodes.

20. The method of claim 15, wherein monitoring the power demand includes:
monitoring a power consumption from the backup power supply by the at least one node; and
storing information on the power consumption in a non-volatile memory at a selected interval on the test and diagnostics circuit.

* * * * *